T. J. MARION.
CAR FENDER.
APPLICATION FILED JUNE 3, 1910.

991,732.

Patented May 9, 1911.
2 SHEETS—SHEET 1.

Witnesses

Inventor
Thomas J. Marion,
By Joshua R. H. Potts
Attorney

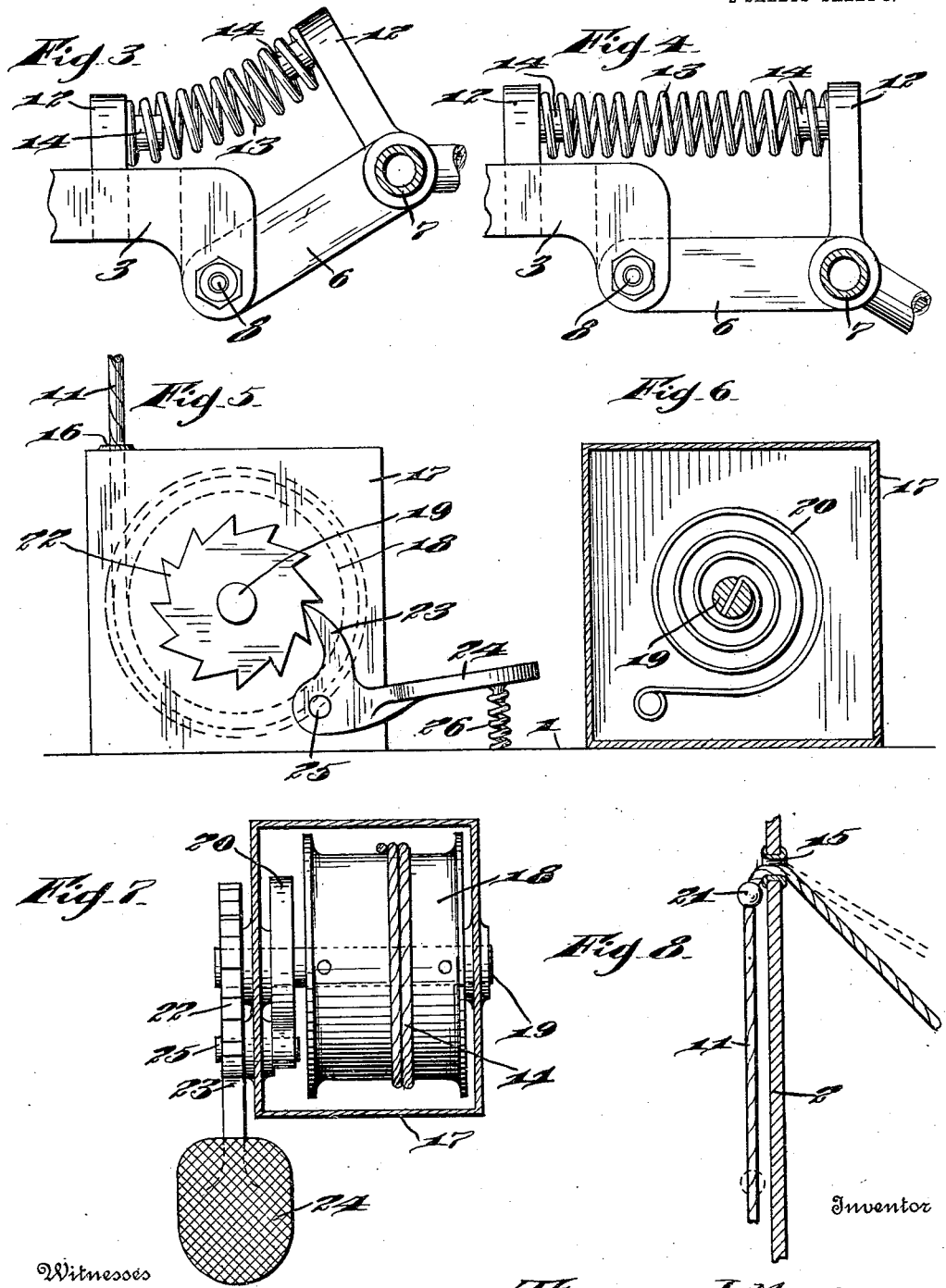

UNITED STATES PATENT OFFICE.

THOMAS J. MARION, OF TRENTON, NEW JERSEY.

CAR-FENDER.

991,732.

Specification of Letters Patent. Patented May 9, 1911.

Application filed June 3, 1910. Serial No. 564,760.

*To all whom it may concern:*

Be it known that I, THOMAS J. MARION, a citizen of the United States, residing at Trenton, in the county of Mercer and State of New Jersey, have invented certain new and useful Improvements in Car-Fenders, of which the following is a specification.

My invention relates to improvements in car fenders, the object of the invention being to provide an improved fender pivotally connected to the car with improved means for holding the fender elevated, improved mechanism for releasing the holding means, and springs for forcing the fender down onto the track, and preventing it from bouncing up, so as to insure the picking up of a person or object on the track.

With these and other objects in view, the invention consists in certain novel features of construction and combinations and arrangements of parts, as will be more fully hereinafter described and pointed out in the claims.

Figure 1:
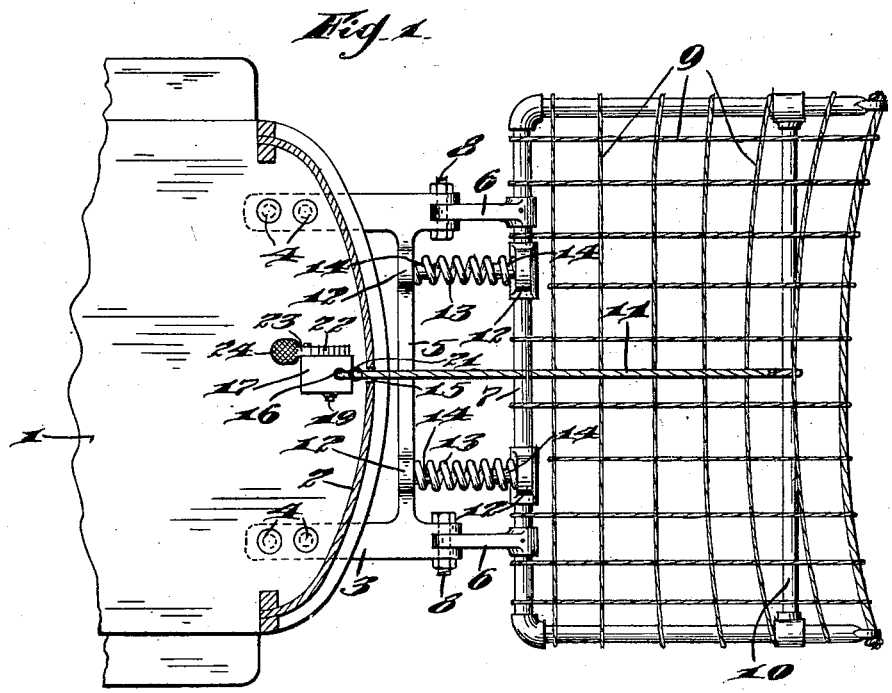
Figure 2:
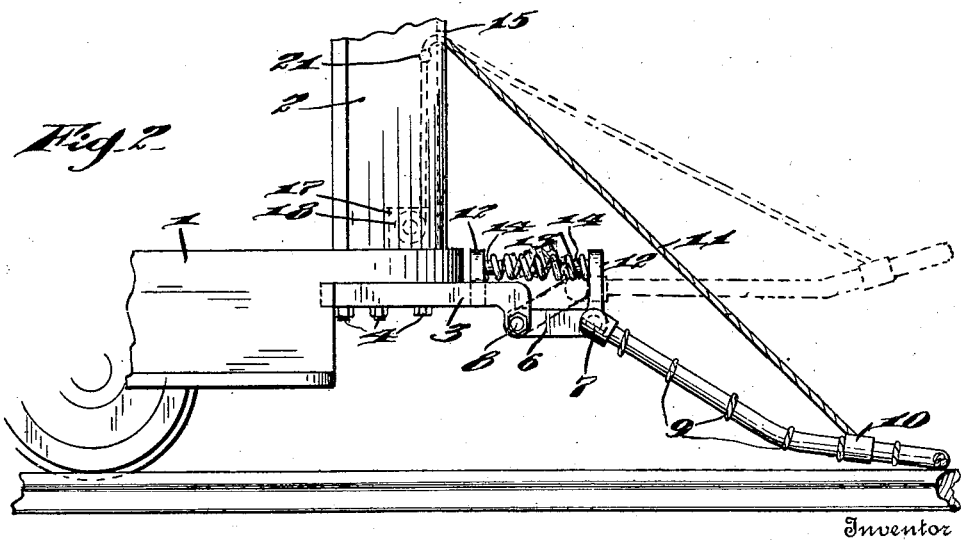

In the accompanying drawings: Figure 1, is a sectional plan view illustrating my improvements. Fig. 2, is a view in side elevation. Figs. 3, and 4, are enlarged views in side elevation illustrating the spring mechanism for the fender. Figs. 5, 6, and 7, are detail views illustrating the means for holding the fender elevated, and Fig. 8, is an enlarged view illustrating the flexible connecting device and its passage through the dash board.

1, represents a platform and 2 the dash board of an ordinary trolley car. A frame 3 is secured to the under face of the platform 1 by means of bolts 4, and this frame is preferably a single casting having a cross bar 5 connecting the longitudinal members which are secured to the platform 1. The forward ends of the longitudinal members of the frame 3 are bifurcated, and arms 6 immovably fixed to the fender rod 7 are pivotally supported in these bifurcated ends by means of bolts 8.

The fender proper may, of course, be made in various ways, but I preferably employ one consisting of a metal frame connected by a rope netting 9, and the side members of the fender frame are connected by a cross rod 10, to which a flexible connecting device 11 is secured, which is adapted to hold the fender in an elevated position, as will more fully hereinafter appear.

Upright lugs 12 are provided on frame 3, and on the rear bar of the fender. Coiled springs 13 are positioned between the lugs on frame 3 and the fender, so as to normally press the forward end of the fender onto the track. These springs are held against displacement by small studs 14 on the lugs 12.

The flexible connecting device 11, above referred to, passes through an eye 15 in the dash board 2, and then extends downward through an opening 16 in the top of a box 17, and is then fixed to a reel 18 mounted on a shaft 19, projecting through the box.

The box 17 is fixed to the platform 1, and a light convolute spring 20 is secured at one end to the shaft 19, and at its other end to the box, and this spring has sufficient strength to wind the reel when the weight of the fender is relieved or overcome, so that when the motorman draws the fender upward by pulling on the flexible connecting device 11, the spring 20 will turn the reel 18 and wind the device 11 thereon. To facilitate this movement of the fender, a button or hand-hold 21 is secured on the flexible connecting device 11 within easy reach of the motorman.

To hold the fender at the desired elevation, a ratchet wheel 22 is fixed to the shaft 19 outside of the box 17, and is engaged by a dog 23 fixed to a foot-lever 24, and the latter is pivoted on a pin 25 at one side of the box 17 and normally held in engagement with the ratchet wheel by means of a spring 26. The fender is normally held in the position shown in dotted lines in Fig. 2. When the motorman sees a person or object on the track, he depresses foot-lever 24, causing the dog 23 to release the ratchet wheel 22, permitting the shaft 19, and reel 18 to turn, thus allowing springs 13 to force the fender downward onto the track, and these springs 13 will hold the fender in its lowered position, preventing it from bounding upwardly and assuring the picking up of the person or object on the track.

To elevate the fender, the motorman grasps the button 21, and elevates the fender, the spring 20 serving to turn the reel and wind the rope thereon, the ratchet wheel during this movement riding under the dog 23.

Various slight changes might be made in the general form and arrangement of the parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. The combination with a car, of a frame on the car, a fender, arms on the fender pivotally connected to said frame, upwardly projecting lugs on the fender, and on the frame, coiled springs between said lugs exerting pressure on the fender to force it downwardly, a flexible device connected to the front end of the fender, and a ratchet mechanism on the car controlling said flexible device, substantially as described.

2. The combination with a car, of a frame secured to the car, a fender, arms fixed to the rear end of the fender and pivotally connected to said frame, upwardly projecting lugs on the fender and frame, coiled springs between said lugs exerting pressure on the fender to force it downwardly, and means for holding the fender in elevated position, substantially as described.

3. The combination with a car, a fender pivotally connected to the car, a dash board on the car having an opening therein, and a flexible connecting device secured at one end to the fender and projecting through the opening in the dash board, of a box located on the platform, a shaft projecting through the box, a reel in said box on which the flexible connecting device is wound, a spring tending to turn said reel in one direction to wind the flexible connecting device thereon, a ratchet wheel on said shaft, a pivoted foot-lever, a dog on said lever engaging the ratchet wheel, and a spring holding said dog in engagement with the ratchet wheel, substantially as described.

4. The combination with a car, a fender pivotally connected to the car, a dash board on the car having an opening therein, and a flexible connecting device secured at one end to the fender and projecting through the opening in the dash board, of a box located on the platform, a shaft projecting through the box, a reel in said box on which the flexible connecting device is wound, a spring tending to turn said reel in one direction to wind the flexible connecting device thereon, a ratchet wheel on said shaft, a pivoted foot-lever, a dog on said lever engaging the ratchet wheel, a spring holding said dog in engagement with the ratchet wheel, and coiled springs exerting pressure on the fender to press the fender downward, substantially as described.

In testimony whereof I have signed my name to this specification in the presence of two subscribing witnesses.

THOMAS J. MARION.

Witnesses:
R. H. KRENKEL,
C. E. POTTS.